(12) United States Patent
Schouten

(10) Patent No.: US 12,085,689 B2
(45) Date of Patent: Sep. 10, 2024

(54) MUON TOMOGRAPHY SYSTEM, APPARATUS, AND METHOD FOR TUNNEL DETECTION

(71) Applicant: IDEON TECHNOLOGIES INC., Richmond (CA)

(72) Inventor: Douglas William Schouten, Surrey (CA)

(73) Assignee: IDEON TECHNOLOGIES INC., Richmond (CA)

( * ) Notice: Subject to any disclaimer, the term of this patent is extended or adjusted under 35 U.S.C. 154(b) by 0 days.

(21) Appl. No.: 17/599,915

(22) PCT Filed: Apr. 3, 2020

(86) PCT No.: PCT/CA2020/050454
§ 371 (c)(1),
(2) Date: Sep. 29, 2021

(87) PCT Pub. No.: WO2020/198885
PCT Pub. Date: Oct. 8, 2020

(65) Prior Publication Data
US 2022/0196874 A1 Jun. 23, 2022

Related U.S. Application Data

(60) Provisional application No. 62/829,008, filed on Apr. 3, 2019.

(51) Int. Cl.
*G01N 9/24* (2006.01)
*G01V 5/04* (2006.01)

(52) U.S. Cl.
CPC ................ *G01V 5/04* (2013.01); *G01N 9/24* (2013.01); *G01N 2223/205* (2013.01)

(58) Field of Classification Search
CPC ........ G01V 5/04; G01N 9/24; G01N 2223/205
(Continued)

(56) References Cited

U.S. PATENT DOCUMENTS

| 3,656,019 A | 4/1972 | Stowe |
| 4,504,438 A | 3/1985 | Levy et al. |

(Continued)

FOREIGN PATENT DOCUMENTS

| JP | 2015075334 | 4/2015 |
| WO | 2009002602 A2 | 12/2008 |

(Continued)

OTHER PUBLICATIONS

M. Basset et al., "MGR: An innovative, low-cost and compact cosmic-ray detector", Nuclear Instruments and Methods In Physics Research A 567 (2006) 298-301.

(Continued)

*Primary Examiner* — Michael Maskell
(74) *Attorney, Agent, or Firm* — Oyen Wiggs Green & Mutala LLP

(57) ABSTRACT

A system for passively monitoring territory proximate to or at restrictive boundaries for tunnels, the system comprising a plurality of muon sensors, a data network in communication with each muon sensor, a power network in electrical communication with each muon sensor, and a data analysis unit, the data analysis unit in communication with each muon sensor via the data network, the data analysis unit comprising a memory and a processor, the memory configured to instruct the processor to analyse data from the plurality of muon detectors to identify and locate a new or emerging tunnel. A method of locating tunnels is also provided.

12 Claims, 7 Drawing Sheets

(58) Field of Classification Search
USPC .................................................. 250/306, 307
See application file for complete search history.

(56) References Cited

U.S. PATENT DOCUMENTS

| | | |
|---|---|---|
| 6,909,098 B2 | 6/2005 | Bross et al. |
| 7,488,934 B2 | 2/2009 | Bryman |
| 7,531,791 B2 | 5/2009 | Bryman |
| 7,863,571 B2 | 1/2011 | Beken |
| 8,288,721 B2 | 10/2012 | Morris et al. |
| 8,384,017 B2 | 2/2013 | Botto |
| 8,881,808 B2 | 11/2014 | Dorffer et al. |
| 9,482,763 B2 | 11/2016 | Vasilyev et al. |
| 9,841,511 B2 | 12/2017 | Saenger |
| 9,851,311 B2 | 12/2017 | Sossong et al. |
| 10,191,180 B2 | 1/2019 | Yaish et al. |
| 10,451,745 B1 * | 10/2019 | Bonal ........................ G01T 1/20 |
| 10,585,208 B1 | 3/2020 | Yaish et al. |
| 10,598,799 B1 | 3/2020 | Berlin |
| 2008/0128604 A1 | 6/2008 | Bryman |
| 2010/0270462 A1 | 10/2010 | Nelson et al. |
| 2011/0035151 A1 | 2/2011 | Botto |
| 2014/0319365 A1 | 10/2014 | Sossong et al. |
| 2020/0018863 A1 | 1/2020 | Bonal et al. |

FOREIGN PATENT DOCUMENTS

| | | |
|---|---|---|
| WO | 2011041750 A1 | 4/2011 |
| WO | 2013155075 A1 | 10/2013 |
| WO | 2016145105 A1 | 9/2016 |
| WO | 2021046602 A1 | 3/2021 |
| WO | 2021102399 A1 | 5/2021 |
| WO | 2021237288 A1 | 12/2021 |

OTHER PUBLICATIONS

R. Schwitters et al., "A Detector for Muon Tomography" (June 2004).
C. Hui, "Maya Muon Tomography Muon Tracking, and Muon Simulation", The University of Texas at Austin (Aug. 2007).
R. C. Ruchti. "The Use of Scintillating Fibers for Charged-Particle Tracking", Annu. Rev. Nucl. Part. Sci. 1996. 46:281-319 (1996).
The UT Maya Muon Project "Proposal to Build a Prototype Detector for Underground Cosmic Ray Muons" (Jan. 2004).
K. Nagamine et. al, "Method of probing inner-structure of geo-physical substance with the horizontal cosmic-ray muons and possible application to volcanic eruption prediction", Nuclear Instruments and Methods in Physics Research A 3.56 (1995) 585-595.
Menichelli et al., "A scintillating fibres tracker detector for archaeological applications". Nuclear Instruments & Methods in Physics research Section A, Mar. 2007 (Mar. 2007), vol. 572(1), pp. 262-265.
Eric T Wright, "A detector for muon tomography: Data acquisition and preliminary results", May 1, 2007, XP055289981.
Harel et al., "Lingacom muography". Philos Trans A Math Phys Eng Sci., Jan. 28, 2019 (Jan. 28, 2019), vol. 377 (2137), pp. 1-7.
International Search Report for PCT/CA2020/000036—Drift Tube Borehole Muon Detector System, Apparatus, and Method for Muon Radiography and Tomography.
Written Opinion for PCT/CA2020/000036—Drift Tube Borehole Muon Detector System, Apparatus, and Method for Muon Radiography and Tomography.
M.C. Fouz, "The CMS muon detectors," 2007 IEEE Nuclear Science Symposium Conference Record, pp. 1885-1890. (Year: 2007).
Hildebrandt M: "The low-mass drift chamber system of the MEG experiment", Nuclear Science Symposium and Medical Imaging Conference (NSS/MIC), 2011 IEEE, IEEE, Oct. 23, 2011 (Oct. 23, 2011), pp. 1757-1760, XP032121939, ISSN: 1082-3654, DOI: 10.1109/NSSMIC.2011.6154677 ISBN: 978-1-4673-0118-3.
Lorenzo Bonechi et al: "Atmospheric muons as an imaging tool", arxiv.org, Cornell University Library, 201 Olin Library Cornell University Ithaca, NY 14853, Jun. 10, 2019 (Jun. 10, 2019), XP081375254.
International Search Report for PCT/CA2020/050454—Muon Tomography System, Apparatus, and Method for Tunnel Detection.
Written Opinion for PCT/CA2020/050454—Muon Tomography System, Apparatus, and Method for Tunnel Detection.

* cited by examiner

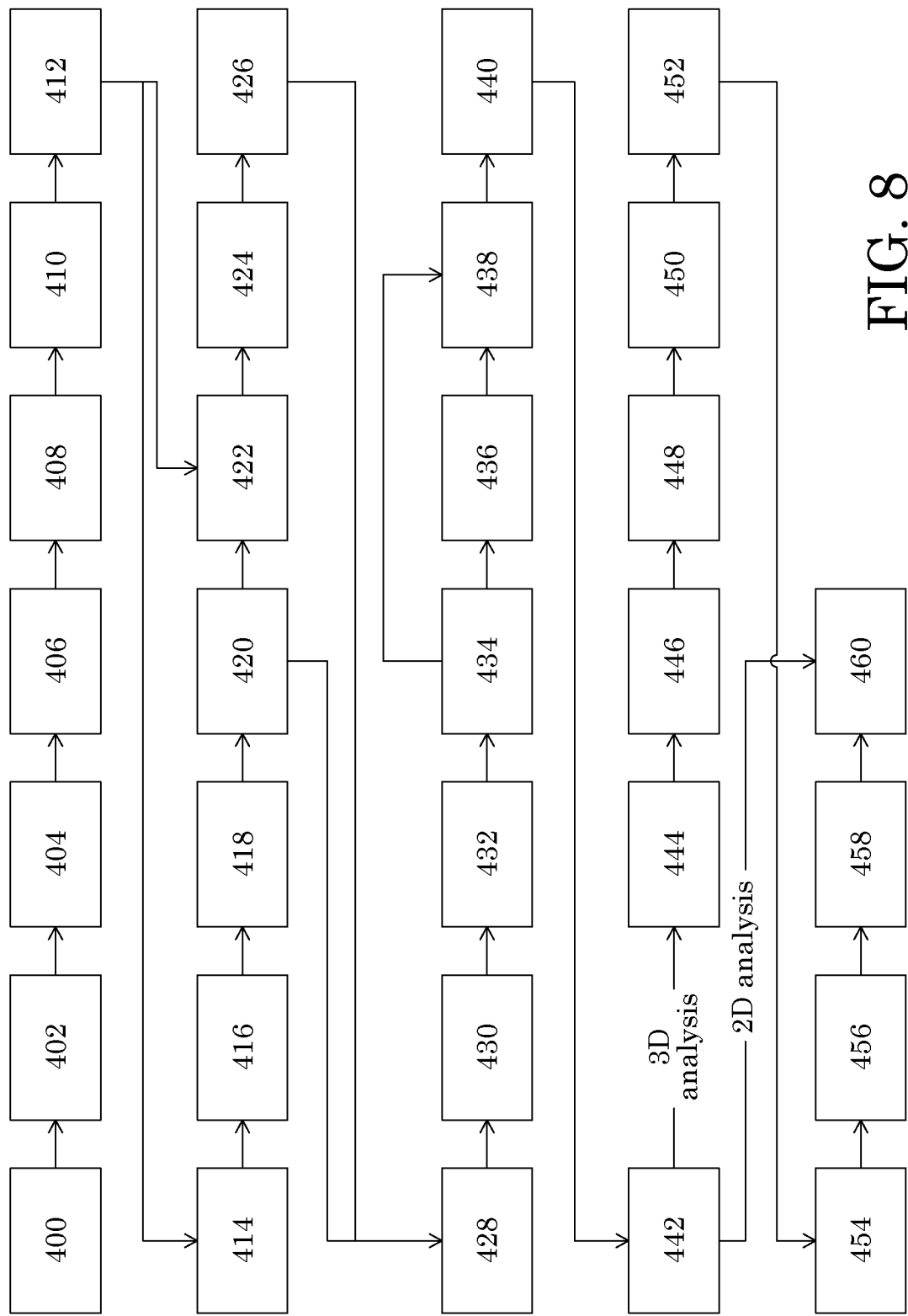

MUON TOMOGRAPHY SYSTEM, APPARATUS, AND METHOD FOR TUNNEL DETECTION

FIELD

The present technology is directed to a system and method for passively monitoring subterranean locations for voids. More specifically, it is a series of muon detectors and a method of employing the series in passively monitoring political borders and other restrictive boundaries for new and emerging tunnels and passageways.

BACKGROUND

Tunnels and other underground passageways are used for illegal transport of people, drugs and other illicit materials. They may be built to allow prisoners to escape from prison, for illegal immigration and for other illegal transborder activities. These tunnels and underground passageways are a type of elongated subterranean void. It is known that muon detectors can be used to study subterranean voids, as the voids lead to a higher than normal flux of muons.

Examples of the use of muon detectors include U.S. Pat. No. 8,384,017 which discloses methods and related systems for use for making subterranean nuclear measurements to study fluid migration. The system can include a plurality of elongated scintillator members each generating optical signals in response to ionizing radiation. Optical detector units can be optically coupled to at least one end of each elongated scintillator member so as to detect optical signals from each elongated scintillator member. The system can be suitable for permanent or semi-permanent deployment downhole. For example, the system can operate for more than six months in a subterranean deployment measuring cosmic radiation. The system can be suited to monitor density changes in subterranean regions of interest, for example, density changes brought about by steam injection as part of a steam assisted gravity drainage operation. It is only collecting data for targeted areas.

U.S. Pat. No. 8,288,721 discloses techniques, apparatus and systems for detecting particles such as muons for imaging applications. Subtraction techniques are described to enhance the processing of the muon tomography data.

U.S. Pat. No. 7,488,934 discloses a system configured for detecting cosmic ray muon (CRM) flux along a variety of trajectories through a subterranean test region, collecting the muon detection data and processing the data to form a three-dimensional density distribution image corresponding to the test region. The system may be used for identifying concentrations of high (or low) density mineral deposits or other geological structures or formations well below the earth's (or ocean floor) surface. The system may be utilized for imaging geological structures of higher and/or lower density in a test region having a depth of several kilometers or more. This is not a passive system.

What is needed is a detection system that includes a series of muon sensors that are sized and shaped to be deployed in a series of boreholes. It would be preferable if the system included a data analysis and storage unit. It would be preferable if the system could be a permanent installation. It would also be preferable if the system could be used to protect political borders and other restrictive boundaries from illegal traffic. It would be further preferable if the system passively monitored political borders and other restrictive boundaries rather than only collecting data on targeted areas. It would be most preferable if the system could identify both existing elongated voids and those under construction.

SUMMARY

The present technology is a detection system that includes a series of muon sensors that are sized and shaped to be deployed in a series of boreholes. The system includes a data analysis and storage unit. The system can be a permanent installation. The system can be used to protect political borders and other restrictive boundaries from illegal traffic. The system can passively monitor political borders and other restrictive boundaries. The system can identify both existing elongated voids and those under construction.

The present technology provides a system, apparatus, and method of identifying and locating subterranean tunnel-like voids using radiographic data from a series of muon sensor devices installed below a region of interest, such as a border, where tunnels may pose a security or safety risk.

In one embodiment, a system for passively monitoring territory proximate to or at restrictive boundaries is provided, the system comprising a plurality of muon sensors, a data network in communication with each muon sensor, a power network in electrical communication with each muon sensor, and a data analysis unit, the data analysis unit in communication with each muon sensor via the data network, the data analysis unit comprising a memory and a processor, the memory configured to instruct the processor to analyse data from the plurality of muon detectors to identify and locate an elongated feature.

In the system, the memory may be further configured to instruct the processor to analyze a data set from at least two muon sensors to determine if the elongated feature is a tunnel.

In the system, the memory may be further configured to instruct the processor to create a three-dimensional map of the tunnel.

In the system, the memory may be further configured to instruct the processor to identify a location of the tunnel.

In the system, each muon sensor may include at least two arrays, each array comprising elongated scintillator bars in a first plane and elongated scintillator bars in a second plane, the elongated scintillator bars in the first plane orthogonal to the elongated scintillator bars in the second plane.

In the system, each scintillator bar may be individually coupled to a photodetector at a first end.

In the system, each scintillator bar may be individually coupled to a photodetector at a second end.

In the system, each scintillator bar may include a bore and an optical fiber housed in the bore, the optical fiber comprising a first end and a second end, each of which are individually attached to the photodetector at each of the first end and the second end of the scintillator bar.

In the system, the muon detector may include a housing which houses the arrays and a plurality of electronic components.

In the system, the plurality of muon sensors is a series.

In another embodiment, a method for monitoring a region of interest for elongated voids is provided, the method comprising:
 providing a muon detection system comprising a plurality of muon sensors and a data analysis unit in communication with each muon sensor, the data analysis unit comprising a processor and a memory, the memory configured to instruct the processor;

inserting each muon sensor of the plurality of muon sensors in a borehole;
the plurality of muon sensors sensing muons;
at least two muon sensors sending at least a first data set and a second data set to the processor, which under control of the memory:
1) identifies an elongated feature in both the first data set and the second data set;
2) calculates the statistical significance of the elongated feature;
3) analyzes the first data set and the second data set to determine whether or not the elongated feature is an elongated void;
4) calculates the statistical significance of the elongated void;
5) and creates a three-dimensional map of the elongated void.

In the method, the plurality of muon sensors may be a series of muon sensors.

The method may further comprise the processor receiving a geographic position of the at least two muon sensors.

The method may further comprise mapping the geographic position of the elongated void.

In an embodiment of the method, the region of interest may be a restrictive boundary and/or a political border, and the elongated void may be a tunnel.

In another embodiment, a method of reducing or eliminating tunneling through a restrictive boundary is provided, the method comprising:
providing a muon detection system comprising a plurality of muon sensors and a data analysis unit in communication with each muon sensor, the data analysis unit comprising a processor and a memory, the memory configured to instruct the processor;
inserting each muon sensor of the plurality of muon sensors in a borehole along or proximate the restrictive boundary to provide a series of muon detectors;
the series of muon sensors sensing muons;
at least two muon sensors sending at least a first data set and a second data set to the processor, which under control of the memory:
1) identifies an elongated feature in both the first data set and the second data set;
2) calculates the statistical significance of the elongated feature;
3) analyzes the first data set and the second data set to determine whether or not the elongated feature is a tunnel;
4) calculates the statistical significance of the tunnel;
5) creates a three-dimensional map of the tunnel;
6) receives a geographic position of the at least two muon sensors;
7) maps the geographic position of the tunnel;
8) reports the geographical position to an operator.

FIGURES

FIG. 5A shows the $(x_1, x_3)$ projection, and FIG. 5B shows the $(x_2, x_3)$ projection.

Figure 7A:
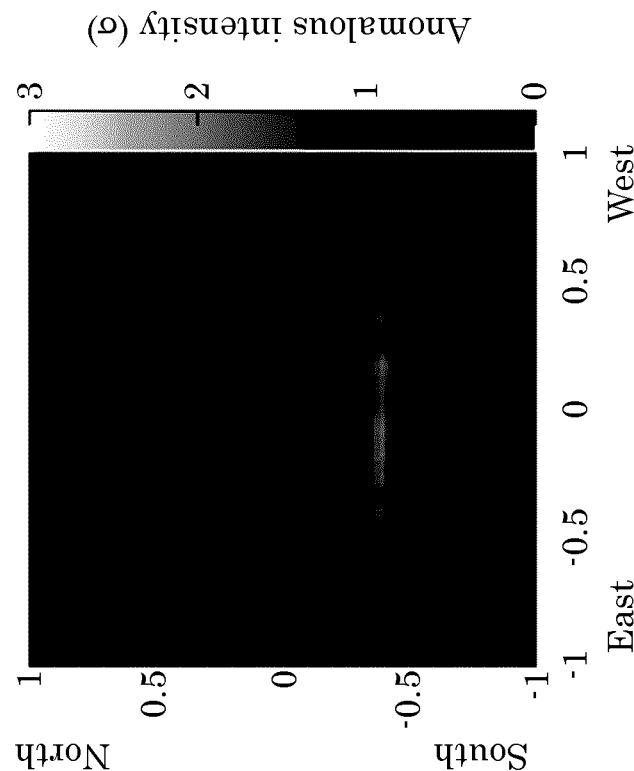
Figure 7B:
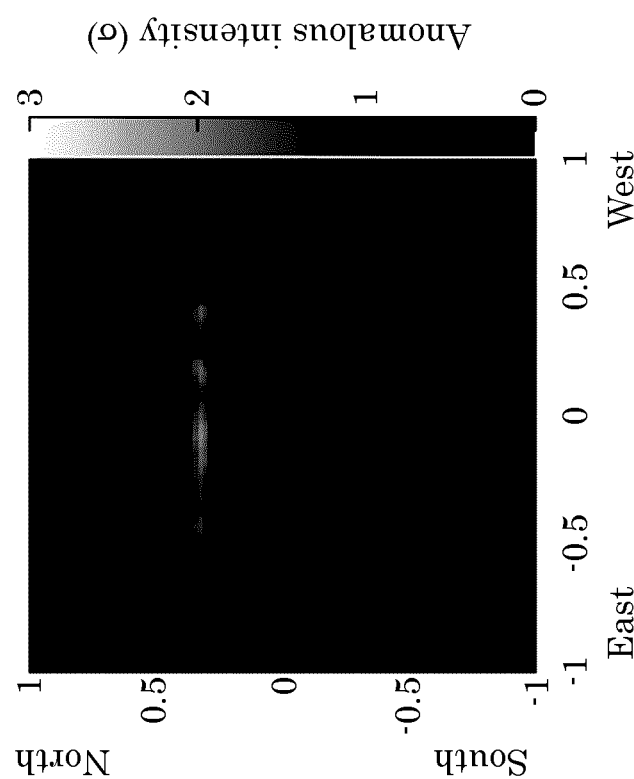
Figure 7C:
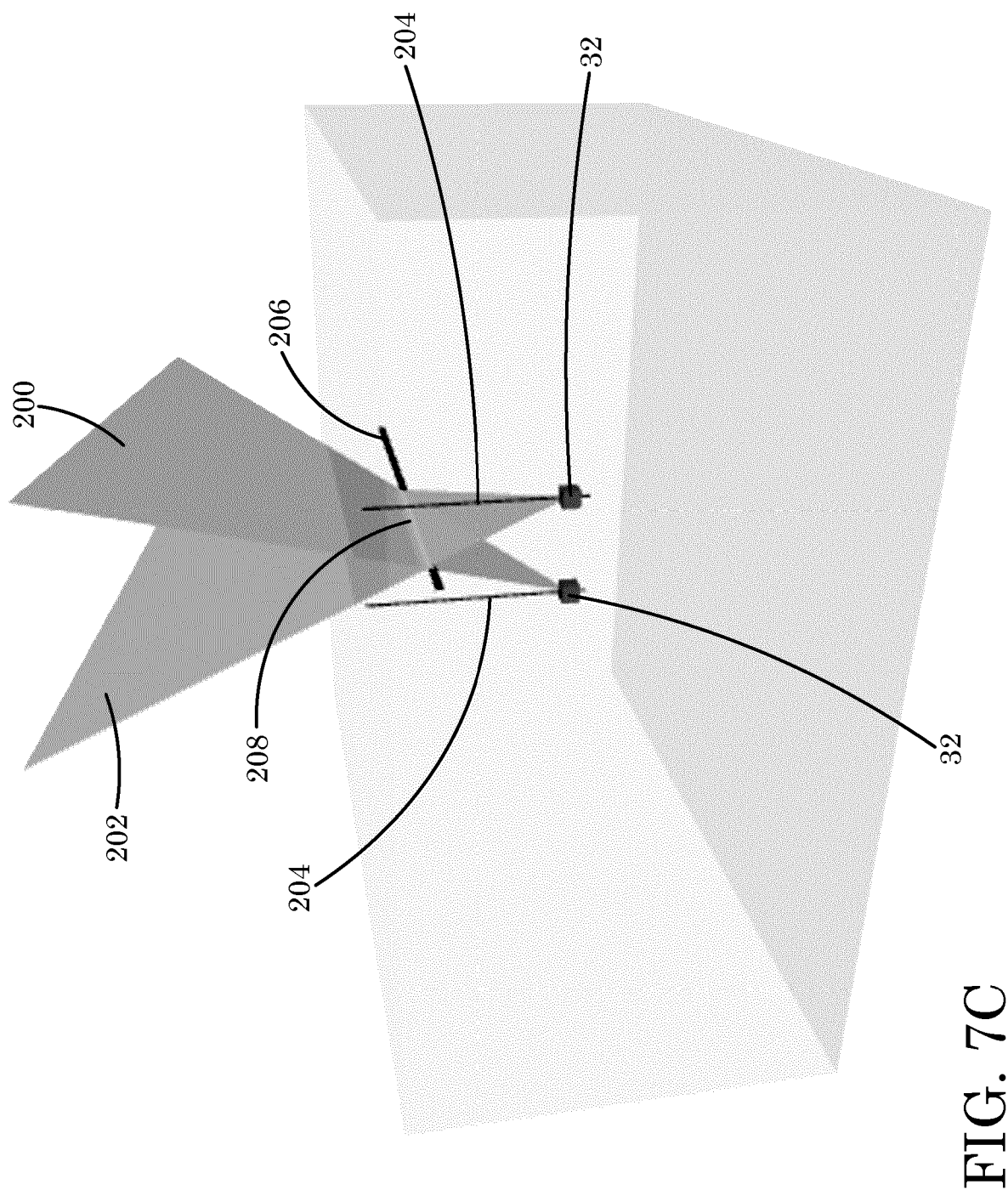

FIGS. 7A, B and C are schematics showing the identification of linear features of higher muon intensity in images and the relationship of these features to planar sections in three dimensions, and the method of locating a tunnel target in three dimensions by combining measurements from a series of muon sensors. FIG. 7A shows muon radiographs for two muon sensors; FIG. 7B shows muon radiographs for two other two muon sensors; and FIG. 7C shows the reconstruction of the radiographs to provide the location and size of a tunnel.

FIG. 8 is a block diagram of the method of the present technology.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "comprising" are not limiting. Further, the terms "comprising," "having," "comprising," and "containing" are to be construed as open-ended terms (i.e., meaning "comprising, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Muon sensor—in the context of the present technology, a muon sensor is any one of: one or more drift tubes longitudinally disposed within a housing, each tube consisting of a bore filled with an ionizing gas containing an axial anode wire; or one or more drift chambers each consisting of a volume of ionizing gas with a plurality of anode wires, the drift chambers either in a cylindrical form factor or in a plane transverse to the enclosure; or a micropattern ionizing gas detector in a cylindrical form factor or in the transverse plane to the enclosure; or a resistive plate chamber in a planar form factor transverse to the enclosure; or segmented plastic scintillators (bars) in the transverse plane to the enclosure, disposed in two orthogonal directions in multiple planes and each bar coupled to photodetectors at one or both ends; or elongated scintillators arranged in a helical bundle and coupled to photodetectors at one or both ends.

Underground elongated void—in the context of the present technology, an underground elongated void is an underground passageway, tunnel or channel. An elongated void may be substantially linear. It is identified using data from two or more muon detectors that detect the same elongated feature and is confirmed through analytics.

Restrictive boundaries—in the context of the present technology, a restrictive boundary is a wall, a fence, a gate, a political border and the like for stopping free passage of people, goods, animals and the like.

Elongated feature—in the context of the present technology, an elongated feature is a putative or potential elongated void that is detected by at least one muon sensor and is yet to be processed and analysed in the determination of it being an elongated void.

Series—in the context of the present technology, a series is three or more, in a substantially linear arrangement. A series may be, for example, between 3 and 10 sensors, between 10 and 100 sensors or greater than 100 sensors.

Detailed Description

Figure 1:
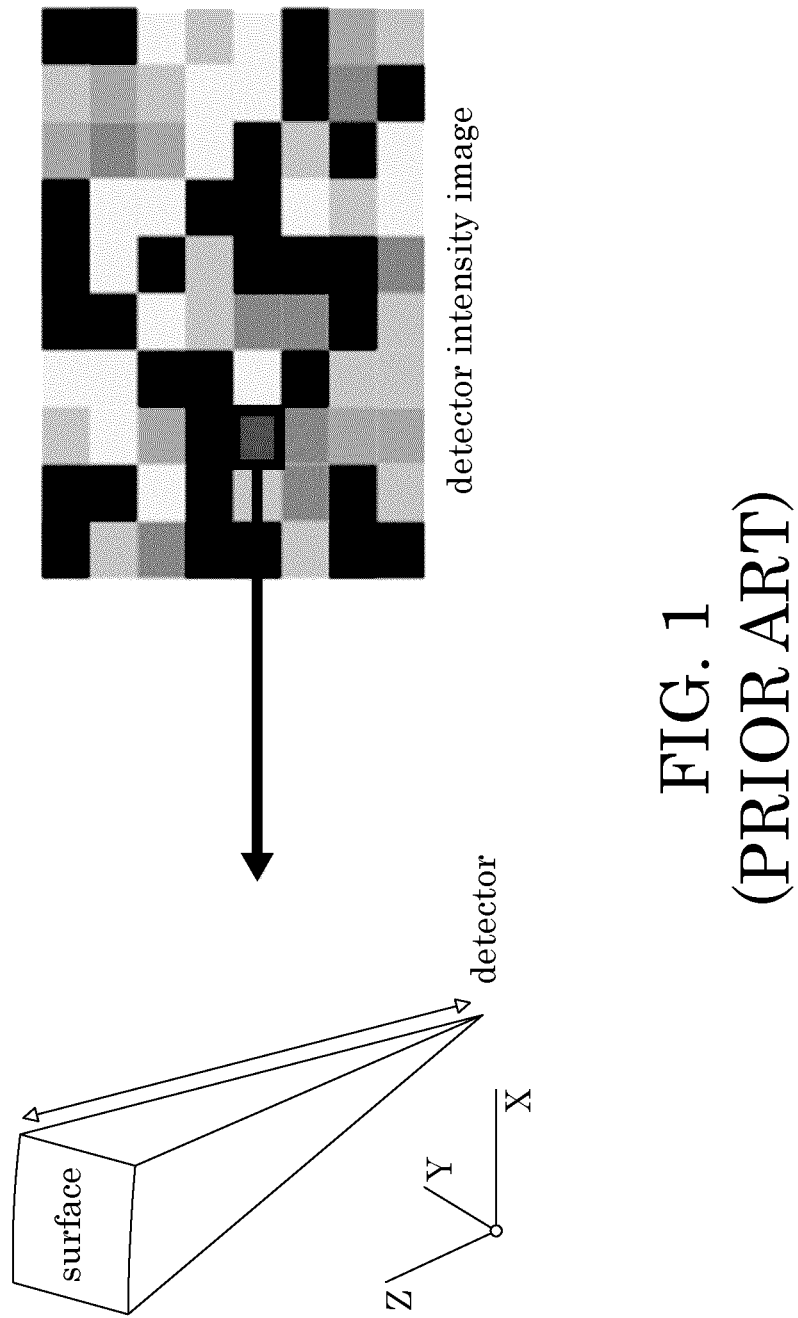
FIG. 1 is a prior art schematic of the relationship between a pixel in a radiographic image and a section of solid angle extending from the underground muon sensor to the surface of the earth.

The present technology relates generally to systems, apparatus, and methods of tracking cosmic ray muons through an underground sensor in order to develop an image of subsurface density above the sensor (muon radiography), to identify features in a radiographic image consistent with the presence of an underground elongated void in a region above and beside the sensor, and to use a series of sensors to locate the underground elongated void in three dimensions. This is useful for searching for unknown and potentially hazardous tunnels. Muon tracking sensors can reconstruct the trajectory (with some finite precision) of almost all muons that pass through them within a large acceptance window, typically around ±60° from vertical with respect to the sensor for a variety of sensor configurations. By recording the rate of muons that pass through the sensor from all angles within the acceptance window, a muon intensity image (radiograph) can be determined as shown in FIG. 1. This intensity image is a measure of the average density of the ground above the sensor.

By identifying lines of higher than expected muon intensity in muon radiographic images, an underground tunnel may be identified or targeted for further investigation. For a single muon sensor, such a line corresponds to a planar section of contiguous solid angle emanating from the sensor to the surface.

Figure 2:
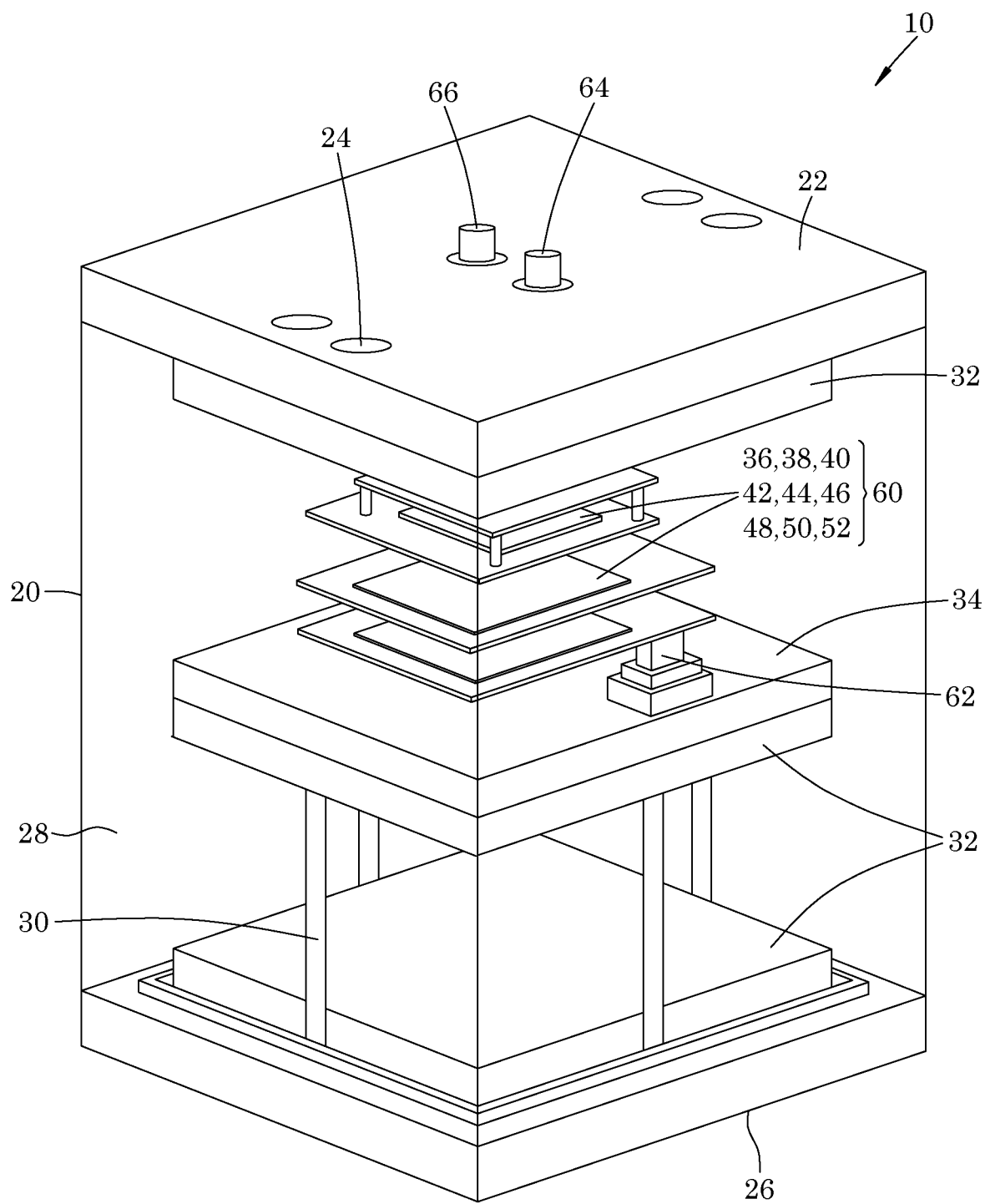
FIG. 2 is a partial cutaway schematic of the device of the present technology.

As shown in FIG. 2, the muon sensor, generally referred to as 10 has an enclosure 20, which is a rectangular shell with a first endcap 22 containing feedthroughs 24 for electrical connections and support cables and a second endcap 26. In an embodiment, the enclosure may be cylindrically shaped. The enclosure 20 is made of suitable plastic, steel, aluminum, or other metal alloy. The enclosure interior 28 has support structures 30 to hold a scintillator bar array 32 firmly in place in a fixed orientation, and it also has a shelf 34 to hold the electronic components (accelerometers 36, gyroscopes 38, humidity sensor 40, temperature sensor 42, printed circuit boards (PCB) 44, field programmable gate array (FPGA), 46, magnetometer 48, processor 50 and memory 52, which are referred to collectively as the digital data acquisition system (DAQ) 60). The accelerometers 36 and gyroscopes 38 are for identifying the exact position and orientation once installed, and the humidity sensor 40 and temperature sensor 42 are for monitoring the operational state of the optical sensors and electronic data acquisition system. In the embodiment shown there are three scintillator bar arrays 32. An exemplary photodetector 62 is shown. The power input feedthrough is a suitable ruggedized DC electrical connector 64. The data input connector consists of a ruggedized shielded data cable connector 66.

Figure 3:
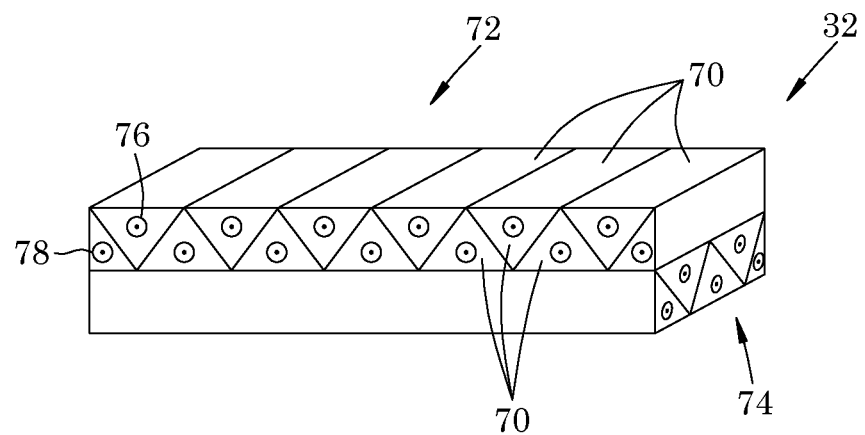
FIG. 3 is a perspective view of the scintillator bars of FIG. 2.

As shown in FIG. 3, in a scintillator bar array 32, the scintillator bars 70 are arranged in a first plane 72 of scintillator bars 70 that are packed in a pattern that minimizes any space between the scintillator bars 70 and a second plane 74 in which the scintillator bars 70 are orthogonal to the scintillator bars 70 of the first plane 72 and are packed in a pattern that minimizes any space between the scintillator bars. The scintillator bars 70 have less than a few square centimeters in cross-sectional area, and many centimeters in length. The scintillator bars 70 have a central bore 76 through which a wave-length shifting (WLS) optical fiber 78 extends. The fibers 78 have a high internal reflection coefficient to transmit photons collected from the scintillation pulse to the fiber ends. The central bore 76 has a cross sectional area of less than a few square millimeters.

In an alternative embodiment, the scintillator bar array 32 within each muon sensor consists of multiple pairs of orthogonally oriented planes 72, 74 of long scintillator members.

Figure 4:
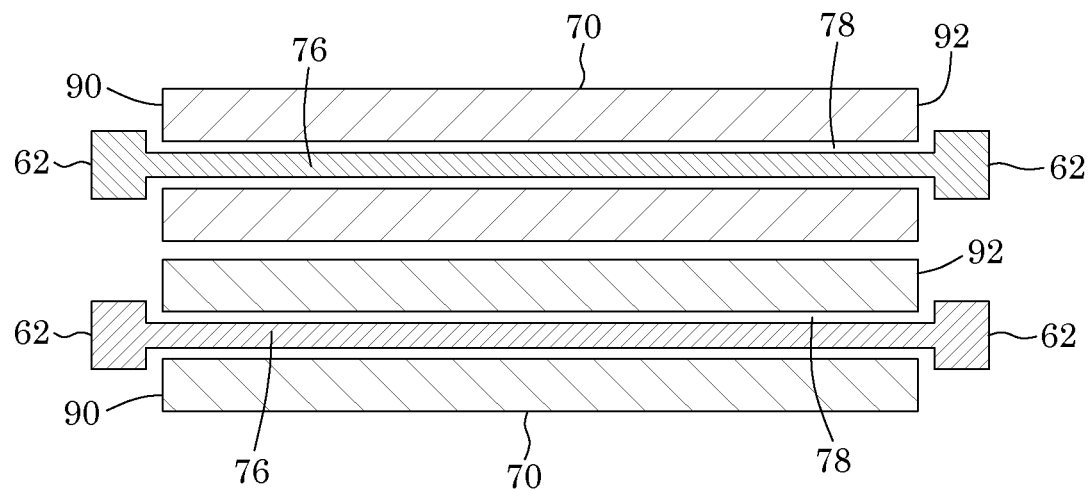
FIG. 4 is a schematic longitudinal view through two adjacent scintillator bars of the muon sensor of FIG. 3.

As shown in FIG. 4, photodetectors 62 are affixed to each end 90, 92 (or, in an alternative embodiment, one end) of the optical fiber 78 for each scintillator bar 70. The photodetectors 62 are connected to the PCB 44 through cables or soldered mounts. The PCB 44 consists of preamplifiers to amplify the current output from the photodetectors 62, a high voltage generator to supply potential to the photodetectors 62, application specific integrated circuits (ASIC's), analog to digital converters, a field programmable gate array (FPGA), an accelerometer, magnetometer, and gyroscope, and ethernet and/or coaxial connectors for digital data and power.

In an alternative embodiment, a clear optical fiber replaces the wave-length shifting optical fiber 78, if the wavelength of the emitted light from the scintillator bars 70 matches the optimal sensitivity of the photodetector. In another embodiment of the device, the scintillator bars 70 are very narrow and do not have a central bore 76 and no optical fiber 78. The photodetectors 62 are attached to each end of the scintillator bars 70.

In another embodiment, there are multiple scintillator bar arrays 32 within each muon sensor 10, each array 32 consisting of multiple pairs of orthogonally oriented planes of scintillator bars 70 with either a rectangular or triangular, or hexagonal cross-sectional shape.

In all embodiments, the scintillator bars 70 are organic polymer scintillators containing an appropriate dopant so that scintillation light is produced by the passage of charged particles. Each scintillator bar 70 is coated with a reflective layer on the sides and ends so that light produced inside the scintillator bar 70 is reflected back into it.

In all embodiments, the photodetectors 62 are multi-pixel photodiode arrays enabled by a bias voltage of a few tens of volts, supplied by a voltage regulator within the system. The electrical signals from the photodetectors 62 are amplified and passed to a PCB 44 within which is embedded an integrated electronic circuit that precisely times the arrival of the electrical signal. The integrated circuit propagates the timing and light yield information for all channels to a device such as an FPGA 46 for coincidence detection, when a user-configured number of photodetectors emit an electrical signal (detect light) within a user-configured period of time. The positions of the scintillator bars 70 from which light was detected are used to reconstruct the path of the muon through the device 10.

Figure 5A:
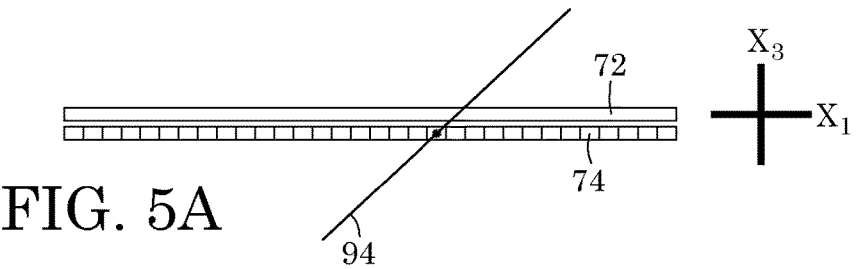
FIGS. 5A and 5B are schematics showing a muon trajectory through a scintillator bar array 32.
Figure 5B:
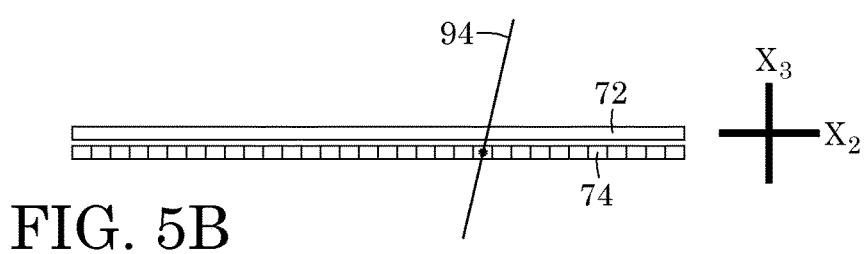

As shown in FIGS. 5A and B, using a single muon as an example, the muon travels in straight-line trajectory 94 through a single pair of orthogonal planes 72, 74 of scintillator bars 70. FIG. 5A shows the $(x_1, x_3)$ projection, and FIG. 5B shows the $(x_2, x_3)$ projection, of the same plane pair. As the muon passes through each pair of orthogonal planes 72, 74, one or more scintillator bars 70 in each of the orthogonal planes emits scintillation light, which is captured by the WLS fiber 78 and transmitted to the photodetector 62, creating an electrical signal that is analyzed with the digital logic of the DAQ 60. Since the plane pairs consist of orthogonally oriented arrays 32 of scintillator bars 70, sets of $(x_1, x_3)$ and $(x_2, x_3)$ measurements of the muon position are performed by using the knowledge of the position of the scintillator bars 70, where $x_1$, $x_2$, and $x_3$ are the three coordinates required to identify a point in three dimensions. Multiple pairs of orthogonal planes separated by a distance in $x_3$ are used to determine the position of the muon at different points along its trajectory 94. These multiple position measurements are exploited to determine a straight-line muon trajectory 94 in three dimensions for each muon that passes through the sensor. The rate at which muons by a single muon sensor 10 are detected within certain ranges of angle ("pixels") is a muon radiographic image. From one plane pair, a three-dimensional muon position measurement is ascertained. Criteria that distinguish muon trajectories from background noise (such as arising from latent radioactivity in the surrounding environment, or from electronic noise) are applied to the reconstructed tracks, and the path trajectory 94 is saved to the sensor radiograph data for further offline analysis. Data are sent to a data aggregation network that collects data from the data interfaces of the series of sensors.

Figure 6:
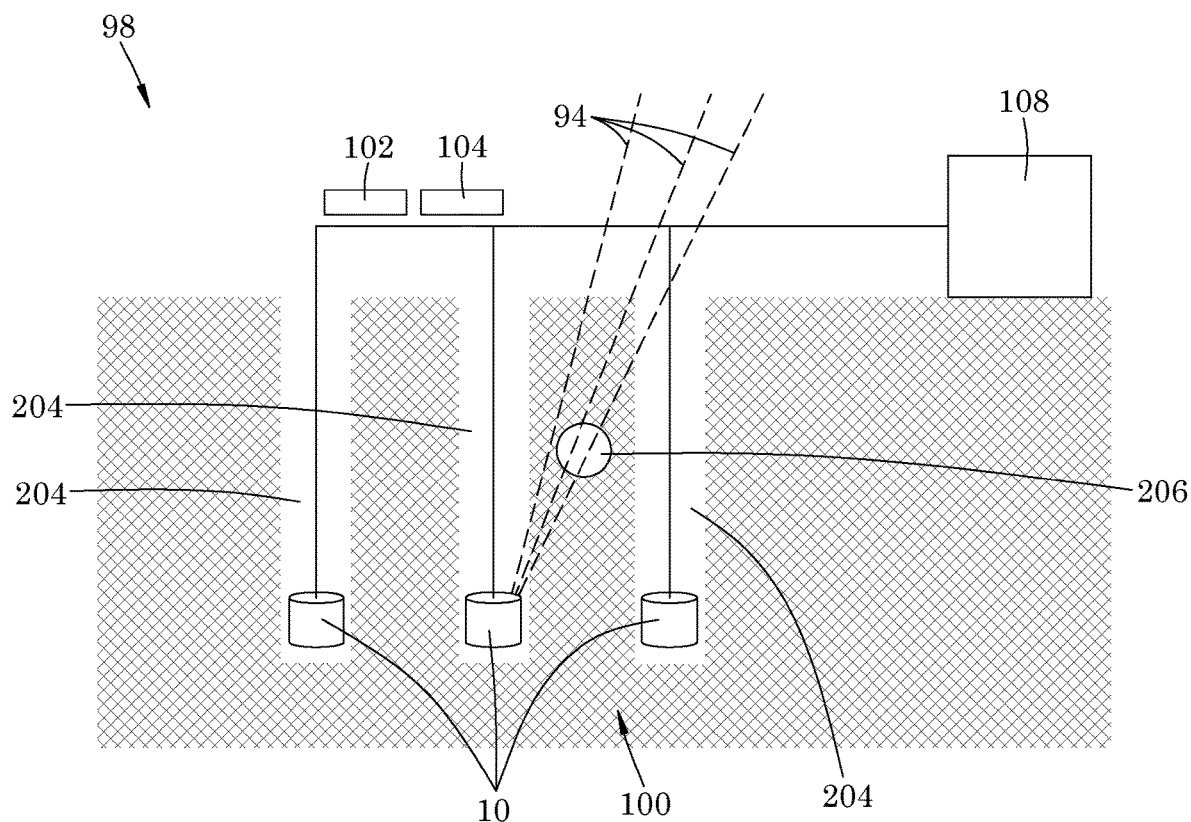
FIG. 6 is a schematic showing an installation of the present technology.

As shown in FIG. 6, a muon sensor system or installation, generally referred to as 98, includes a series of muon detectors, generally referred to as 100, is installed underground below a region of interest in boreholes 204. A power distribution network 102 provides electrical power through cabling to the enclosure feedthroughs of each muon sensor 10, and the muon sensors 10 are interconnected on a data network 104 over which radiograph data for each muon sensor 10 can be queried. The series 100 of muon sensors 10 is suitably arranged to maximize three-dimensional reconstruction capability of any observed linear anomalies to target the location of tunnels and voids. The muon intensity measurements (radiographs) from the muon sensors 10 in the series 100 are collected over the data network 104 and sent to data aggregator 108 for further offline analysis and interpretation. Multiple trajectories are shown passing through the tunnel 206 and intersecting one muon sensor.

For three dimensional images other multiple trajectories pass through the tunnel 206 and intersect at least one other muon sensor 10.

Over any period of exposure time the radiographic images from each muon sensor 10 in the series 100 can be analyzed offline using a specialized algorithm. Elongated voids of higher muon intensity are identified. Corresponding sections of solid angle are constructed and the combination thereof through specialized geophysical inversion algorithms or 3-dimensional surface intersection algorithms are used to identify the target location and extent in three dimensions.

As shown in FIGS. 7A, B and C by combining the images shown in FIG. 7A from a first series 100 of muon sensors 10 with the images shown in FIG. 7B from a second series 100 of muon sensors 10, the intersection of these planar sections for each muon sensor 10 can identify the location of candidate linear features, for example tunnels, in three dimensions. Elongated features (not necessarily aligned with a coordinate) can be identified in the images of FIGS. 7A and 7B. These features correspond to planar-like sections 200, 202 of solid angle emanating from each muon sensor 10 location as depicted in FIG. 7C. The boreholes 204 in which the muon sensors 10 are deployed is indicated by vertical lines, and the target tunnel location 206 is indicated by the horizontal line. The intersection 208 between the two planar sections 200, 202 shows the reconstructed position of the tunnel-like anomaly 206 identified by both of the muon sensors 10.

In the method, as shown in FIG. 8, a series of muon sensors is installed 400 in boreholes, other underground facilities, or adjacent to topographic features such as hills or mountains for monitoring for pre-existing and emerging tunnels and passageways in territory proximate or at political borders and other restrictive boundaries. Although the drawings show two or three muon sensors, it is envisioned that there will be tens to thousands of muon sensors in a series. The muon sensors each continuously and passively monitor 402 the incoming cosmic ray muon intensity from all angles within each sensor's field of view. The field of view of a sensor is an inverted cone or pyramidal shape (depending on the coordinate system chosen) emanating from the sensor. Light is emitted 404 from the scintillator bars in response to the incoming muons and is detected 406 by the photodetector, which then sends 408 a signal to the DAQ. The DAQ analyzes 410 the signals and determines 412 the trajectories of the incident cosmic ray muons.

The trajectories of muons are described in a straight-line sense by two discrete three-dimensional points along the trajectory to a fixed point in the sensor or equivalently by a single discrete three-dimensional point and two angles. The DAQ creates 414 a dataset of radiographic images defined in some coordinate system (such as polar angles θ, φ or rectilinear coordinates such as $\tan(\theta_x)$, $\tan(\theta_y)$) which is then time-stamped 416 to provide 418 time-stamped intensity maps. The acquired muon flux data within the field of view is uploaded 420 over a common network at periodic intervals to the central data analysis unit. Alternatively, the raw data are time-stamped 422 and sent 424 to a computing device in the data analysis unit where the raw, time-stamped data are stored 426 for later analysis.

The computing device includes a processor and a memory, the memory comprising instructions thereon for instructing the processor. The processor, under control of the memory detects 428 spatially connected pixels in the muon intensity map which have either higher or lower (than the surrounding pixels) cosmic ray muon intensity, and identifies 430 where the connectedness is linear in the sense of being significantly elongated along a major axis that may be parallel to or at some angle with respect to either axis of the radiographic image. The processor, under control of the memory, identifies 432 elongated features on this basis.

The statistical significance of a given elongated feature is calculated 434 by the processor, under control of the memory. This can be applied to each muon sensor intensity map separately, or to a combined intensity map from multiple muon sensors. If data from a single sensor is analyzed, it will only provide two-dimensional information and will not discriminate between a surface anomaly and a subsurface anomaly, for example. Thus it cannot determine if an elongated feature is an elongated void, nor can it determine its position in three dimensions.

Either an operator or the processor under control of the memory sets 436 the alpha level to determine whether an elongated feature is significant or not. The alpha level takes into account the statistical fluctuations within the cosmic ray muon data as well as any inherent systematic errors of the sensor or data acquisition thereof. The processor under control of the memory reports 438 the significant elongated features and the memory stores 440 the processed data. Each elongated feature in the radiographic image derived from any muon sensor corresponds to an approximately planar section of solid angle emanating from the sensor.

In the case where an elongated feature is detected in two or more muon sensors, further processing may consist of identifying 442 three-dimensional regions of interest within shared fields of view of multiple muon sensors wherein there are overlapping or connected sections of solid angle corresponding to identified elongated features from multiple different radiographic images. The statistical significance of the three-dimensional regions of interest is calculated 444 by the processor, under control of the memory. Either an operator or the processor under control of the memory sets 446 the alpha level to determine whether an elongated feature is significant or not. The statistically significant three-dimensional elongated features are tagged 448 as elongated voids. The memory is configured to instruct the processor to utilize a feature extraction technique to analyse the images, utilize computer vision and conduct digital image processing in order to identify the elongated voids.

The processor optionally compares 450 tagged elongated voids over time to allow for four-dimensional interrogation (three spatial dimensions and time). Data from geographic locating devices comprising, but not limited to a Global Navigation Satellite System (GNSS), accelerometers and gyroscopes is sent 452 to the processor, which, under control of the memory, provides 454 a geographic location for each tagged elongated void. The processor under control of the memory then generates 456 a map of the area and the elongated void or voids which is stored 458 in the memory and is displayed 460 on a user interface.

With this method, an underground elongated void such as a tunnel, passageway, tunnel-like void, tunnel-like region of reduced or enhanced density can be established for further targeted investigation, such as with underground drilling, seismic interrogation, or other techniques. The system may be an installation at or proximate a restrictive boundary such as a political border. The installation is a series of boreholes, each borehole retaining at least one muon sensor, the power and data networks in communication with each muon detector and the data analysis unit which is also in communication with the power and data networks.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A system for passively monitoring territory proximate to or at restrictive boundaries, the system comprising a plurality of muon sensors, a data network in communication with each muon sensor, a power network in electrical communication with each muon sensor, and a data analysis unit, the data analysis unit in communication with each muon sensor via the data network, the data analysis unit comprising a memory and a processor, the memory configured to instruct the processor to analyse data from the plurality of muon detectors to identify and locate an elongated feature,
wherein the memory is further configured to instruct the processor to:
analyze a data set from at least two muon sensors of the plurality of muon sensors to determine if the elongated feature is a tunnel;
create a three-dimensional map of the tunnel; and,
identify a location of the tunnel;
wherein each muon sensor includes at least two arrays, each array comprising elongated scintillator bars in a first plane and elongated scintillator bars in a second plane, the elongated scintillator bars in the first plane orthogonal to the elongated scintillator bars in the second plane,
wherein each scintillator bar is individually coupled to a photodetector at a first end and individually coupled to a photodetector at a second end.

2. The system of claim 1, wherein each scintillator bar includes a bore and an optical fiber housed in the bore, the optical fiber comprising a first end and a second end, each of which are individually attached to the photodetector at each of the first end and the second end of the scintillator bar.

3. The system of claim 2, wherein the muon detector includes a housing which houses the arrays and a plurality of electronic components.

4. The system of claim 3, wherein the plurality of muon sensors is a series of muon sensors.

5. A method for monitoring a region of interest for elongated voids, the method comprising:
providing a muon detection system comprising a plurality of muon sensors and a data analysis unit in communication with each muon sensor, the data analysis unit comprising a processor and a memory, the memory configured to instruct the processor ;
inserting each muon sensor of the plurality of muon sensors in a borehole;
the plurality of muon sensors sensing muons;
at least two muon sensors sending at least a first data set and a second data set to the processor, which under control of the memory:
1) identifies an elongated feature in both the first data set and the second data set;
2) calculates the statistical significance of the elongated feature;

3) analyzes the first data set and the second data set to determine whether or not the elongated feature is an elongated void;
4) calculates the statistical significance of the elongated void;
5) and creates a three-dimensional map of the elongated void.

6. The method of claim 5, wherein the plurality of muon sensors is a series of muon sensors.

7. The method of claim 6, further comprising the processor receiving a geographic position of the at least two muon sensors.

8. The method of claim 7, further comprising mapping the geographic position of the elongated void.

9. The method of any one of claims 5 to 8, wherein the region of interest is a restrictive boundary.

10. The method of claim 9, wherein the restrictive boundary is a political border.

11. The method of any one of claims 5 to 10, wherein the elongated void is a tunnel.

12. A method of reducing or eliminating tunneling through a restrictive boundary, the method comprising:
providing a muon detection system comprising a plurality of muon sensors and a data analysis unit in communication with each muon sensor, the data analysis unit comprising a processor and a memory, the memory configured to instruct the processor;
inserting each muon sensor of the plurality of muon sensors in a borehole along or proximate the restrictive boundary to provide a series of muon detectors;
the series of muon sensors sensing muons;
at least two muon sensors sending at least a first data set and a second data set to the processor, which under control of the memory :
1) identifies an elongated feature in both the first data set and the second data set;
2) calculates the statistical significance of the elongated feature;
3) analyzes the first data set and the second data set to determine whether or not the elongated feature is a tunnel;
4) calculates the statistical significance of the tunnel;
5) creates a three-dimensional map of the tunnel;
6) receives a geographic position of the at least two muon sensors;
7) maps the geographic position of the tunnel; and
8) reports the geographic position to an operator.

* * * * *